United States Patent

[11] 3,573,473

[72] Inventor Zeev Lieser
Elizabeth, N.J.

[21] Appl. No. 863,778
[22] Filed Oct. 6, 1969
[45] Patented Apr. 6, 1971
[73] Assignee The United States of America as represented by the Secretary of the Navy

[54] RADIATION SENSITIVE DIGITAL MESSAGE ENTRY DEVICE

10 Claims, 8 Drawing Figs.

[52] U.S. Cl. .......... 250/219, 340/173, 340/347
[51] Int. Cl. .......... G08c 9/06
[50] Field of Search .......... 250/219 (F), 219 (ICR), 219 (ID), 219 (IA), 219 (IAS), 219 (L), 106; 356/71; 340/347 (DD), 173 (Light), 173 (LSS)

[56] References Cited

UNITED STATES PATENTS

| | | | |
|---|---|---|---|
| 2,580,270 | 12/1951 | Badgley et al. | 250/219X |
| 3,176,132 | 3/1965 | Muller | 250/106X |
| 2,424,879 | 1/1969 | Shlesinger, Jr. | 250/219X |
| 3,431,552 | 3/1969 | Weeks et al. | 356/71X |
| 3,479,652 | 11/1969 | Foster | 340/173 |

*Primary Examiner*—Walter Stolwein
*Attorneys*—R. S. Sciascia and John W. Pease

ABSTRACT: A digital message entry device wherein a wide format scroll displaying instructions for message composition is placed in cooperative encompassing relation to a plurality of message scrolls with means for selectively moving each scroll to provide message storage and display and in which a self energizing light source and associated photodiode means are provided to provide readout means for bulk transmission to a central location to be decoded, displayed, switched or acted upon.

Patented April 6, 1971

3,573,473

2 Sheets-Sheet 1

ZEEV LIESER
INVENTOR.

BY [signature]

Attorney

Patented April 6, 1971

3,573,473

2 Sheets-Sheet 2

ZEEV LIESER
INVENTOR.

BY John M. Pease

Attorney

RADIATION SENSITIVE DIGITAL MESSAGE ENTRY DEVICE

BACKGROUND OF THE INVENTION where large quantities of data are involved, it is most efficient for the operator to transfer the input information, offline, into a digital message entry device which the computer or other data processing system can then absorb at its own more rapid rate.

Conventionally message entry devices have taken various forms including punched tapes or cards and magnetic tapes. Separate machines such as typewriters or IBM machines are used to formulate the message or the message and the format instructions, and various forms of readout devices are utilized to transfer the message.

The several disadvantages in such apparatus include cost, weight and bulk of the several components involved. Inherent in prior devices is the double effort required of the operator to use reference charts to obtain necessary message characters and subsequently to enter the character of the device. Also required in such prior art devices is the need to form a separate display of entered data. A further time consuming effort is required in the prior art devices to correct errors or to accomplish message editing.

SUMMARY OF THE INVENTION

In accordance with the subject invention the problems and disadvantages mentioned above are eliminated or mitigated. Thus, in accordance with the subject invention a format scroll and several independently operated message scrolls each having code markings thereon are arranged in superimposed relatively moveable relation to relieve the operator of the double effort of reference to charts and subsequent data code entry. Manipulation of the message scrolls into desired display per se provides message storage since the scrolls themselves are printed with the required code corresponding to the scroll position. Further, by manipulating the scrolls into proper relation corresponding to a message the operator has simultaneously provided both data storage and display without the need for reference to a separate code symbol or message library. The invention further provides in the form of photodiode means and a self-energized light source a readout means for the transfer of data which is minimal in cost, weight and bulk and one which does not require accurate alignment of the message storage means. This is an improvement over the use of punched cards or tapes which require accurate alignment. A further advantage resides in the fact that by manipulation of the individual scrolls error correction or message editing is easily achieved for every character regardless of its position in the message.

DESCRIPTION OF THE PREFERRED EMBODIMENTS

Figures 1, 2:
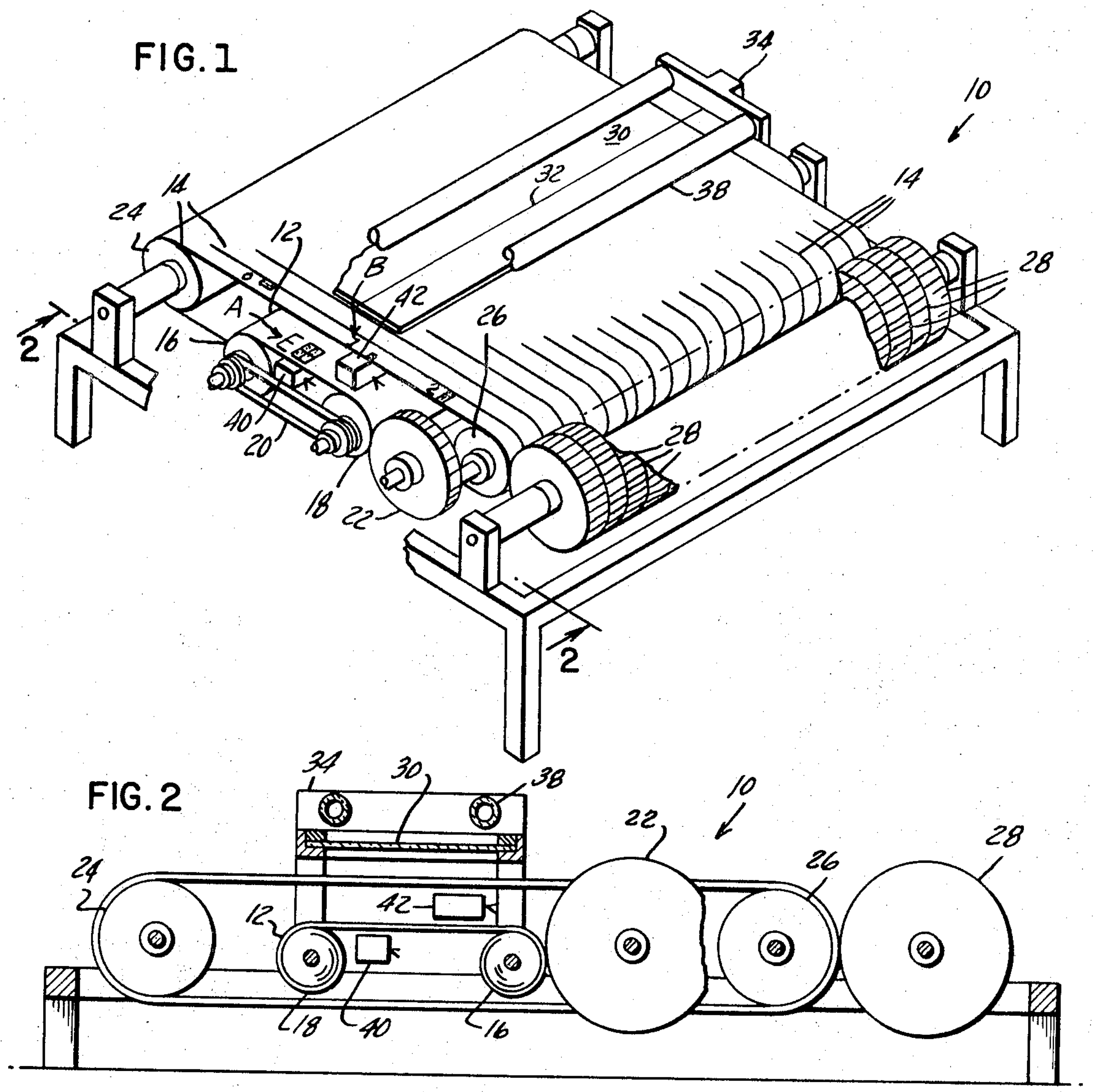
FIG. 1 is a perspective view of a device embodying the invention.
FIG. 2 is a side elevation taken on line 2–2 of FIG. 1.

Referring to FIGS. 1 and 2 numeral 10 indicates a digital message entry device embodying the invention in a form in which a master format scroll 12 is encompassed by a plurality of message scrolls 14 aligned in side by side relation. On the master format scroll is printed instructions in the form of headings for columns represented by the plurality of individual message scrolls. Several different sets of instructions are printed on several linear segments of the master scroll. One printed instruction in letter and code is indicated by the arrow A. The scroll itself is mounted on suitable rolls, as for example, takeup roll 16 and supply roll 18 connected by drive belt 20. Suitable drive means, as for example control wheel 22 engaging roller 18, is provided for rotating the master format scroll 12 to select a desired format.

Encompassing the master format scroll 12 and in side by side relation on rollers 24 and are provided the plurality of message scrolls 14. Each message 14 is individually rotatable by respective of a plurality of message scroll control wheels indicated at 28, each wheel engaging its associated scroll. Scrolls 12 and 14 are made of suitable material such that an underlying scroll may be read through an encompassing scroll. One such suitable material is a transparent nylon.

For convenience in reading the format scroll 12 and associated message scrolls 14 an elongated window 30 having a zero index line 32 is mounted on suitable supports 34, one of which is shown in FIGS. 1 and 2. The index line 32 is normal to the line of travel of the message scrolls 14.

Figure 5:
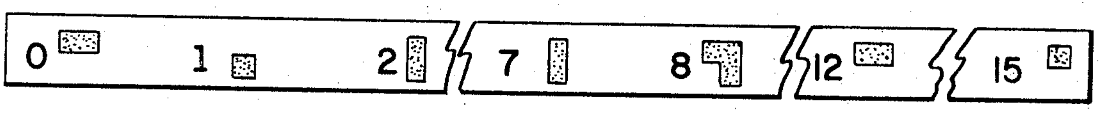
FIG. 5 shows a numerical code marking which can be used on the message scrolls of either of the devices shown in FIGS. 1 and 3.

To provide for readout and transfer of data from the device 10 to a central location, I provide a suitable light source and photodiode means positioned to monitor the codes printed on the message and format scrolls. In this respect an incandescent light source can be employed where power supply is not critical. However, where environment use necessitates, I provide, in accordance with one further aspect of my invention, a light source of a self energizing type, one example of which includes a phosphor lined element containing radioactive tritium gas. Thus, as shown in FIGS. 1 and 2 the light tube window 30 is formed with a tubular peripheral portion 38 which is phosphor lined and contains radioactive tritium gas. Photodiode elements 40 and 42 are positioned as shown to read the respective message character code and format scroll code. Examples of suitable messenger character codes for numbers is shown in FIG. 5. Printing on the format scroll and the message scroll is spaced such that the scrolls may be indexed one with respect to the other to avoid superimposed position of one printing over another. Thus, a printed section of one scroll may be viewed through a nonprinted transparent section of the other scroll. In the example shown in FIG. 1 the format character indicated at the arrow A and the message character indicated at the arrow B are simultaneously viewed through window 30.

Figure 3:
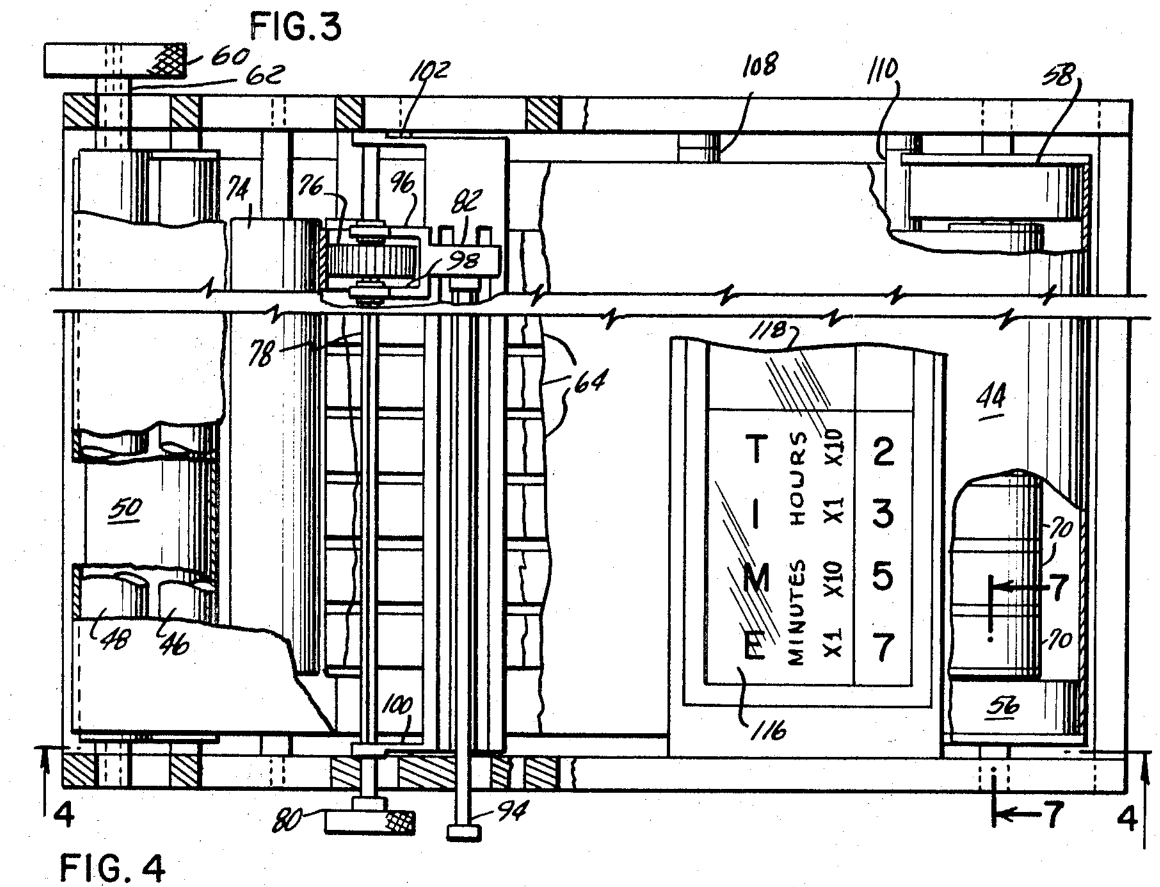
FIG. 3 is a plan view of a device showing a modified form of the invention.
Figure 4:
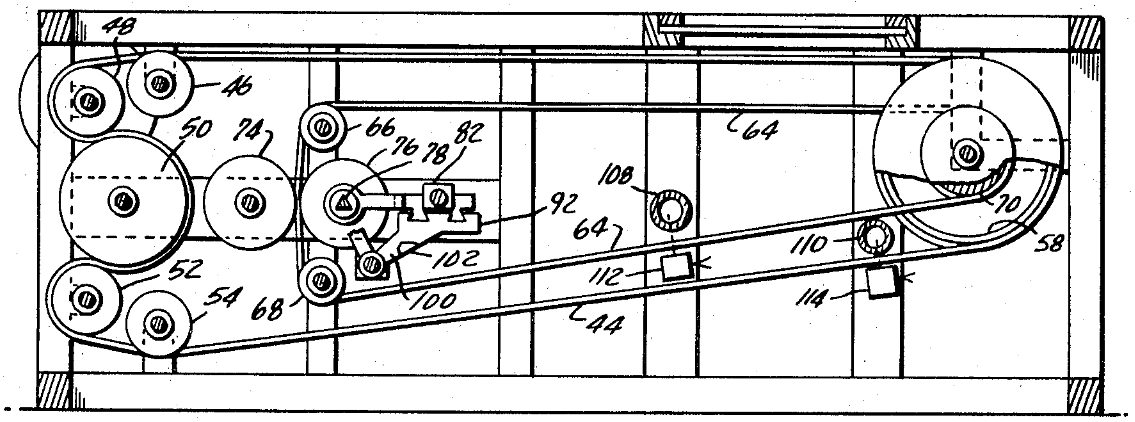
FIG. 4 is a side elevation taken on line 4–4 of FIG. 3.

Referring to FIGS. 3 and 4 there is shown an embodiment of the invention in which the encompassing relationship of the format and message scrolls is reversed, and in which the activating means for the messenger scrolls is simplified to a single control wheel slidably and nonrotatably fitted to a manually rotatable shaft.

Thus, in FIGS. 3 and 4 a format scroll 44 is mounted on a plurality of rollers shown at 46, 48, 50, 52 and 54 on the left side of FIG. 4 and on two rollers 56 and 58 shown at the right side of FIG. 3. The rollers 56 and 58 are flanged as shown by the detail of roller 56 shown in FIG. 7. Rollers 46, 50, 52 and 54 are idler rollers. Roller 48 is utilized as a drive roller, and is provided with a knob 60 and shaft 62 by which the format scroll 44 can be adjustably indexed.

Figure 7:
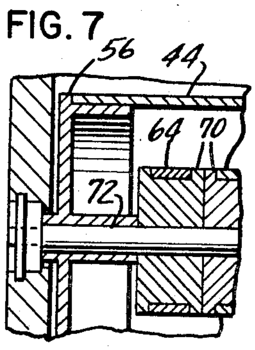
FIG. 7 is a partial sectional view taken on line 7–7 of FIG. 3.

A plurality of strip scrolls 64 are mounted in side by side relation on elongated idler rollers 66 and 68 (FIG. 4) and individually on a plurality of idler rollers 70 (FIG. 3). Idler rollers 70 are positioned between the end rollers 56 and 58 and rotate on a common shaft 72. FIG. 7 shows detail of the rollers 70 and roller 56 in relation to the strip scrolls 64 and format scroll 44.

To rotate the individual message scrolls 64 I provide a backing roller 74 (see FIG. 4) against which the individual scrolls 64 may be pressed and a rotatable and slidably positionable control wheel 76. Control wheel 76 is nonrotatably mounted to slide on an angular cross section shaft 78 to be moved to a selected strip scroll. An adjusting knob 80 is fixed to one end of shaft 78, to thereby provide for rotation of the wheel 76 responsive to manual rotation of the knob 80.

To slide the control wheel 76 along the shaft 78 I provide a slide connector 82 having downwardly projecting feet 84 and 86 slidable in grooves 88 and 90 of a support base 92. A positioning rod 94 is connected to the slide connector 82 and the slide connector is formed with fork portions 96 and 98 for engaging opposite side of the control wheel 76.

Figure 8:
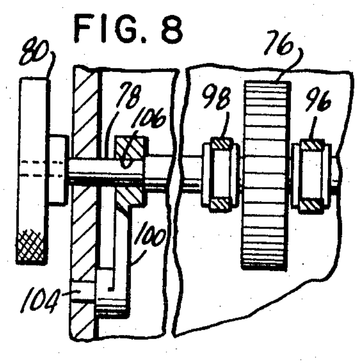
FIG. 8 is a partial sectional view taken on line 8–8 of FIG. 6.
Figure 6:
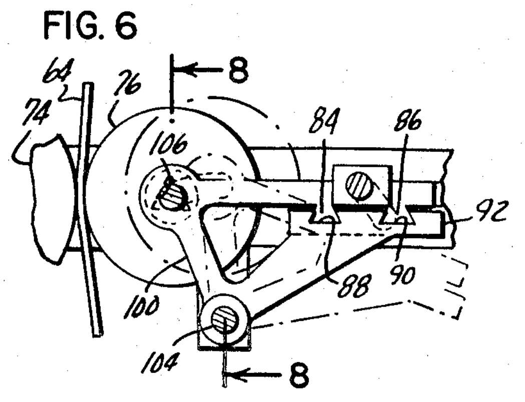
FIG. 6 is an enlarged elevational view of an actuator mechanism of the device of FIGS. 3 and 4.

To swing the control wheel 76 away from the scrolls 64 when the wheel 76 is to be slidably moved, I provide a pair of bell crank rockers 100 and 102, one for supporting one end of the base support 92 and one end of the rod 78, and the other for supporting the opposite ends of the rod 78 and support 92. To simplify the drawing details of only one bell crank are shown, as in FIGS. 6 and 8, of the drawing. Referring to FIGS. 6 and 8 the bell crank 100 is mounted to rock on a support shaft 104. The base 92 is mounted integral with one leg of the bell crank and the shaft 78 supporting the wheel 76 is journaled in an aperture 106 in the other leg of the bell crank 100.

In operation the wheel 76 may be swung away from the strip scrolls 70 by rocking of the bell cranks on the shaft 104 and the wheel 76 may be slidably moved on the shaft 78 by the rod 94 and connector 82 to alignment with a selected of the strip scrolls 70. The wheel is then swung back into engagement with the selected strip scroll to move the latter to a selected message data position.

Light source means indicated at 108 and 110 are provided for use with respective photodiode means 112 and 114 to readout the character codes on the respective message scrolls and the format scroll. A window glass 116 having a zero index line 118 is provided to read the message and format scrolls. One example of readings on the two scrolls is indicated in FIG. 3. In FIG. 4 numeral 120 and 122 identify the corresponding code characters for the instruction headings shown in FIG. 3.

I claim:

1. A digital entry message device comprising:
   - a. a transparent format scroll means having portions thereof printed with column headings of instruction data and corresponding format codes characters;
   - b. a message composition scroll means comprising a plurality of individual strip scrolls arranged in side by side relation each printed with message composition data and character code;
   - c. roller means for supporting said format and message scroll means in overlying relation one encompassing the other with each strip scroll aligned with an associated column heading of said format scroll;
   - d. means for rotating said format scroll to select a desired data format;
   - e. means for rotating said strip scrolls individually to develop a data message for said selected data format; and
   - f. light source means and photodiode means positioned to provide a format code reader and message code reader to produce output signals representative of the data stored in said device by the adjustment of said respective scroll means.

2. Apparatus according to claim 1; said strip scrolls overlying and encompassing said format scroll means.

3. Apparatus according to claim 1; said format scroll means overlying and encompassing said strip scrolls.

4. Apparatus according to claim 1; said rotating means for said strip scrolls including a plurality of control wheels each engaged with a respective strip scroll.

5. Apparatus according to claim 1; said rotating means for said strip scrolls including a shaft with integral control knob and a control wheel slidably and nonrotatably fitted to said shaft for linear movement along said shaft and rotation by said shaft.

6. Apparatus according to claim 1; said light source including a phosphor lined element containing radioactive tritium gas for self energization.

7. Apparatus according to claim 2; said light source including a phosphor lined element containing radioactive tritium gas for self energization.

8. Apparatus according to claim 3; said light source including a phosphor lined element containing radioactive tritium gas for self energization.

9. Apparatus according to claim 5; said light source including a phosphor lined element containing radioactive tritium gas for self energization.

10. Apparatus according to claim 1:
   - a. said rotating means for said strip scrolls including a shaft with integral control knob and a control wheel slidably and nonrotatably fitted to said shaft for linear movement along said shaft and rotation by said shaft; and
   - b. said light source including a phosphor lined element containing radioactive tritium gas for self energization.